US011945400B2

(12) United States Patent
Kobashi et al.

(10) Patent No.: US 11,945,400 B2
(45) Date of Patent: Apr. 2, 2024

(54) RIDABLE MOVING OBJECT, CONTROL DEVICE FOR RIDABLE MOVING OBJECT, CONTROL METHOD, AND STORAGE MEDIUM

(71) Applicant: HONDA MOTOR CO., LTD., Tokyo (JP)

(72) Inventors: Shinichiro Kobashi, Wako (JP); Makoto Hasegawa, Wako (JP); Sachiko Yamamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/954,376

(22) Filed: Sep. 28, 2022

(65) Prior Publication Data

US 2023/0107865 A1    Apr. 6, 2023

(30) Foreign Application Priority Data

Sep. 30, 2021  (JP) ................................. 2021-161616

(51) Int. Cl.
*B60R 25/01*    (2013.01)
*B60R 25/104*    (2013.01)

(52) U.S. Cl.
CPC ............ *B60R 25/01* (2013.01); *B60R 25/104* (2013.01)

(58) Field of Classification Search
CPC .............................. B60R 25/01; B60R 25/104
See application file for complete search history.

(56) References Cited

U.S. PATENT DOCUMENTS

| 10,472,015 B1* | 11/2019 | Sonderegger | G06F 1/1637 |
| 11,110,892 B2* | 9/2021 | Zhang | G06Q 20/145 |
| 2010/0198453 A1* | 8/2010 | Dorogusker | G06F 1/1626 340/427 |
| 2016/0221627 A1* | 8/2016 | Hines | B62J 6/056 |
| 2020/0276958 A1* | 9/2020 | Zhang | G07F 17/0057 |
| 2021/0072886 A1* | 3/2021 | Verkaaik | G06F 3/04847 |

(Continued)

FOREIGN PATENT DOCUMENTS

| CN | 112991588 | 6/2021 |
| JP | 2003-272072 | 9/2003 |
| JP | 2004-106800 | 4/2004 |

(Continued)

OTHER PUBLICATIONS

Japanese Office Action for Japanese Patent Application No. 2021-161616 dated Nov. 22, 2022.

*Primary Examiner* — Thomas D Alunkal
(74) *Attorney, Agent, or Firm* — Amin, Turocy & Watson, LLP

(57) ABSTRACT

A ridable moving object on which a user gets is provided. The ridable moving object includes a processor configured to execute a program to determine that the user has been away from the ridable moving object, detect a usage intention of another person different from the user for the ridable moving object, and generate an action command for causing the ridable moving object to perform a prescribed operation on a basis of setting information set for at least one of the user and the ridable moving object when it is determined that the user has been away from the ridable moving object and the usage intention of the another person for the ridable moving object has been detected.

6 Claims, 10 Drawing Sheets

(56) References Cited

U.S. PATENT DOCUMENTS

2022/0003561 A1* 1/2022 Shoval ............... G01C 21/3415

FOREIGN PATENT DOCUMENTS

| | | |
|---|---|---|
| JP | 2007-009842 | 1/2007 |
| JP | 2010-120568 | 6/2010 |
| JP | 2018-109989 | 7/2018 |
| JP | 2020-144494 | 9/2020 |
| WO | 2018/123032 | 7/2018 |

* cited by examiner

RIDABLE MOVING OBJECT, CONTROL DEVICE FOR RIDABLE MOVING OBJECT, CONTROL METHOD, AND STORAGE MEDIUM

CROSS-REFERENCE TO RELATED APPLICATION

Priority is claimed on Japanese Patent Application No. 2021-161616, filed Sep. 30, 2021, the content of which is incorporated herein by reference.

BACKGROUND

Field of the Invention

The present invention relates to a ridable moving object, a control device for the ridable moving object, a control method, and a storage medium.

Description of Related Art

A theft detection system has been known which provides a notification to a notification center or the like when the theft of a moving object has been detected (see, for example, Japanese Unexamined Patent Application, First Publication No. 2003-272072).

SUMMARY OF THE INVENTION

However, it is difficult to prevent the misuse of a moving object when someone other than a user has tried to misuse the moving object due to theft or the like. Aspects of the present invention have been made in consideration of such circumstances and an objective of the present invention is to provide a ridable moving object, a control device and a control method for the ridable moving object, and a storage medium capable of limiting the misuse of a moving object by others.

A ridable moving object, a control device for the ridable moving object, a control method, and a storage medium according to the present invention adopt the following configurations.

(1): According to an aspect of the present invention, there is provided a ridable moving object on which a user gets, the ridable moving object including a processor configured to execute a program to determine that the user has been away from the ridable moving object, detect a usage intention of another person different from the user for the ridable moving object, and generate an action command for causing the ridable moving object to perform a prescribed operation on a basis of setting information set for at least one of the user and the ridable moving object when it is determined that the user has been away from the ridable moving object and the usage intention of the another person for the ridable moving object has been detected.

(2): In the above-described aspect (1), the setting information includes at least one type of information indicating that usage authority to use the ridable moving object is set for the user and information indicating that a stop position of the ridable moving object is included in a prescribed place.

(3): In the above-described aspect (1) or (2), the prescribed operation includes at least one of an alarm including a sound or light emission output and a separation operation for separation from the another person.

(4): In any one of the above-described aspects (1) to (3), after the user is away from the ridable moving object and a prescribed period of time elapses, the processor is further configured to execute the program to cancel usage authority of the user to use the ridable moving object.

(5): In any one of the above-described aspects (1) to (4), the processor is further configured to execute the program to set usage authority to use the ridable moving object for the another person requesting the usage authority when the user does not have the usage authority to use the ridable moving object on a basis of the setting information.

(6): According to an aspect of the present invention, there is provided a control device for a ridable moving object, the control device including a processor configured to execute a program to determine that a user has been away from the ridable moving object, detect a usage intention of another person different from the user for the ridable moving object, and generate an action command for causing the ridable moving object to perform a prescribed operation on a basis of setting information set for at least one of the user and the ridable moving object when it is determined that the user has been away from the ridable moving object and the usage intention of the another person for the ridable moving object has been detected.

(7): According to an aspect of the present invention, there is provided a control method for a ridable moving object, the control method including: determining, by a computer, that a user has been away from the ridable moving object; detecting, by the computer, a usage intention of another person different from the user for the ridable moving object; and generating, by the computer, an action command for causing the ridable moving object to perform a prescribed operation on a basis of setting information set for at least one of the user and the ridable moving object when it is determined that the user has been away from the ridable moving object and the usage intention of the another person for the ridable moving object has been detected.

(8): According to an aspect of the present invention, there is provided a non-transitory computer-readable storage medium storing a program for causing a computer to: determine that a user has been away from a ridable moving object; detect a usage intention of another person different from the user for the ridable moving object; and generate an action command for causing the ridable moving object to perform a prescribed operation on a basis of setting information set for at least one of the user and the ridable moving object when it is determined that the user has been away from the ridable moving object and the usage intention of the another person for the ridable moving object has been detected.

According to the aspects (1) to (8), it is possible to limit the misuse of a moving object by others.

DETAILED DESCRIPTION OF THE INVENTION

Hereinafter, embodiments of a ridable moving object, a control device for the ridable moving object, a control method, and a storage medium of the present invention will be described with reference to the drawings.

Ridable moving objects are installed in, for example, amusement facilities such as amusement parks and theme parks. The ridable moving object matches an own vehicle with a user who owns a terminal device, for example, on the basis of an electrical signal transmitted by the owned terminal device, and sets usage authority for the matched user. The ridable moving object is rented to the user for whom the usage authority is set. The ridable moving object may be brought into an amusement facility by the user. The user may have exclusive usage authority to use the ridable moving object brought into the amusement facility by the user or the ridable moving object brought into the amusement facility by the user may be set for another person different from the user.

First Embodiment

Figure 1:
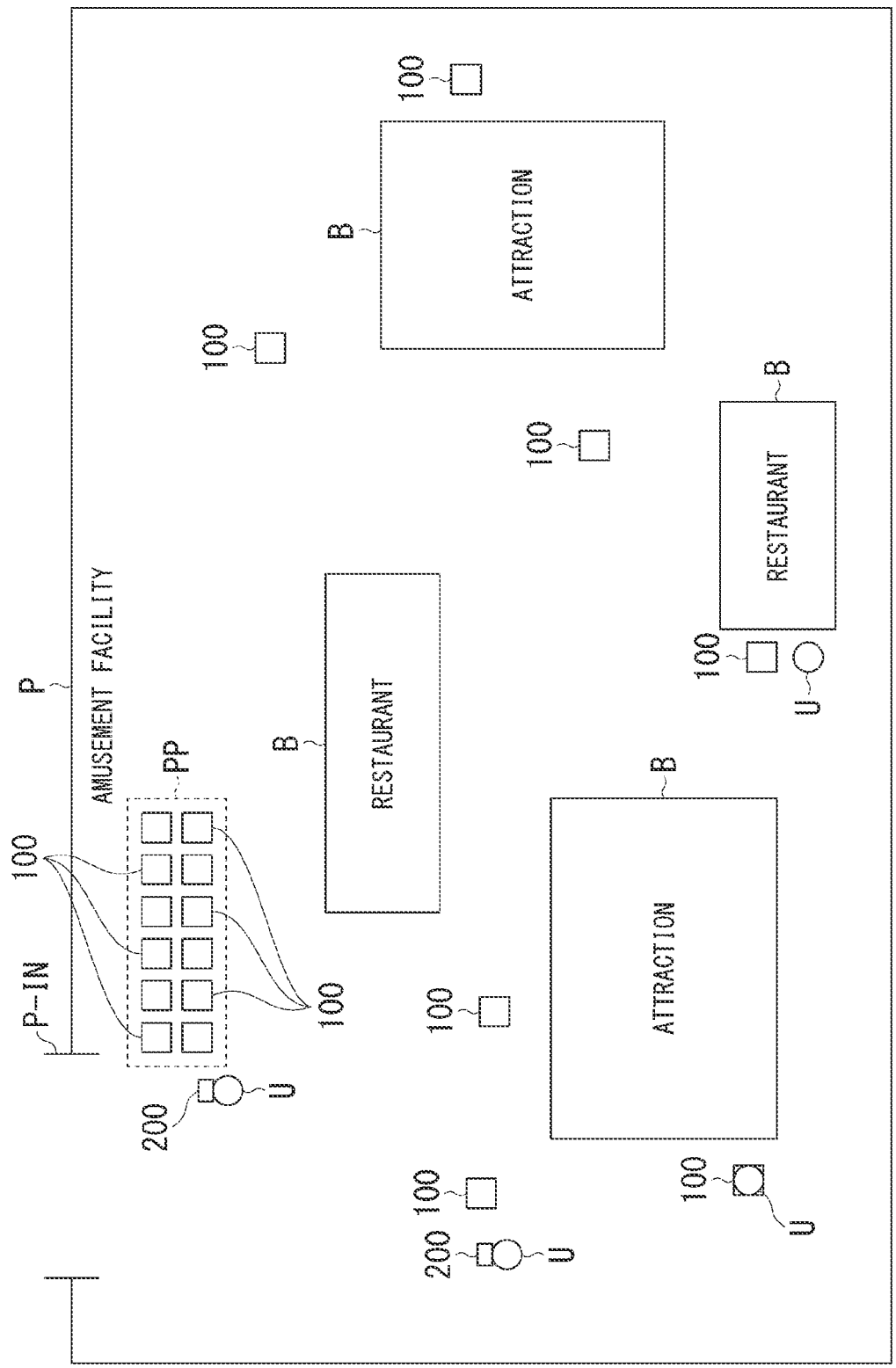
FIG. 1 is an explanatory diagram showing an outline of a moving object management system 1 of a first embodiment.

FIG. 1 is an explanatory diagram showing an outline of a moving object management system 1 of a first embodiment. The moving object management system 1 includes, for example, a ridable moving object 100 and a terminal device 200. A plurality of ridable moving objects 100 are deployed in an amusement facility P. The ridable moving object 100 for which usage authority is not set is, for example, stored in a parking pool PP provided near an entrance P-IN of the amusement facility P or goes around the premises of the amusement facility P. The ridable moving object 100 for which the usage authority is set travels in accordance with the operation of the user U having gotten on the ridable moving object 100 or waits for the user U to get thereon again when the user U gets off the ridable moving object 100. The terminal device 200 is possessed by, for example, the user U.

The ridable moving object 100 includes, for example, a control device for matching the user U with the ridable moving object 100 by operating the terminal device 200 possessed by the user U. By operating the terminal device 200, the user U acquires usage authority to use the ridable moving object 100 for use in the amusement facility P. For example, the user U may acquire the usage authority to use the ridable moving object 100 disposed near the entrance P-IN when he or she enters the amusement facility P or the user U may acquire the usage authority to use the ridable moving object 100 that goes around the premises of the amusement facility P. For example, the user U for whom the usage authority to use the ridable moving object 100 is set moves by getting on the ridable moving object 100 or uses an internal facility B by causing the ridable moving object 100 to stop in the vicinity of the internal facility B such as an attraction or a restaurant within the amusement facility P.

Figure 2:
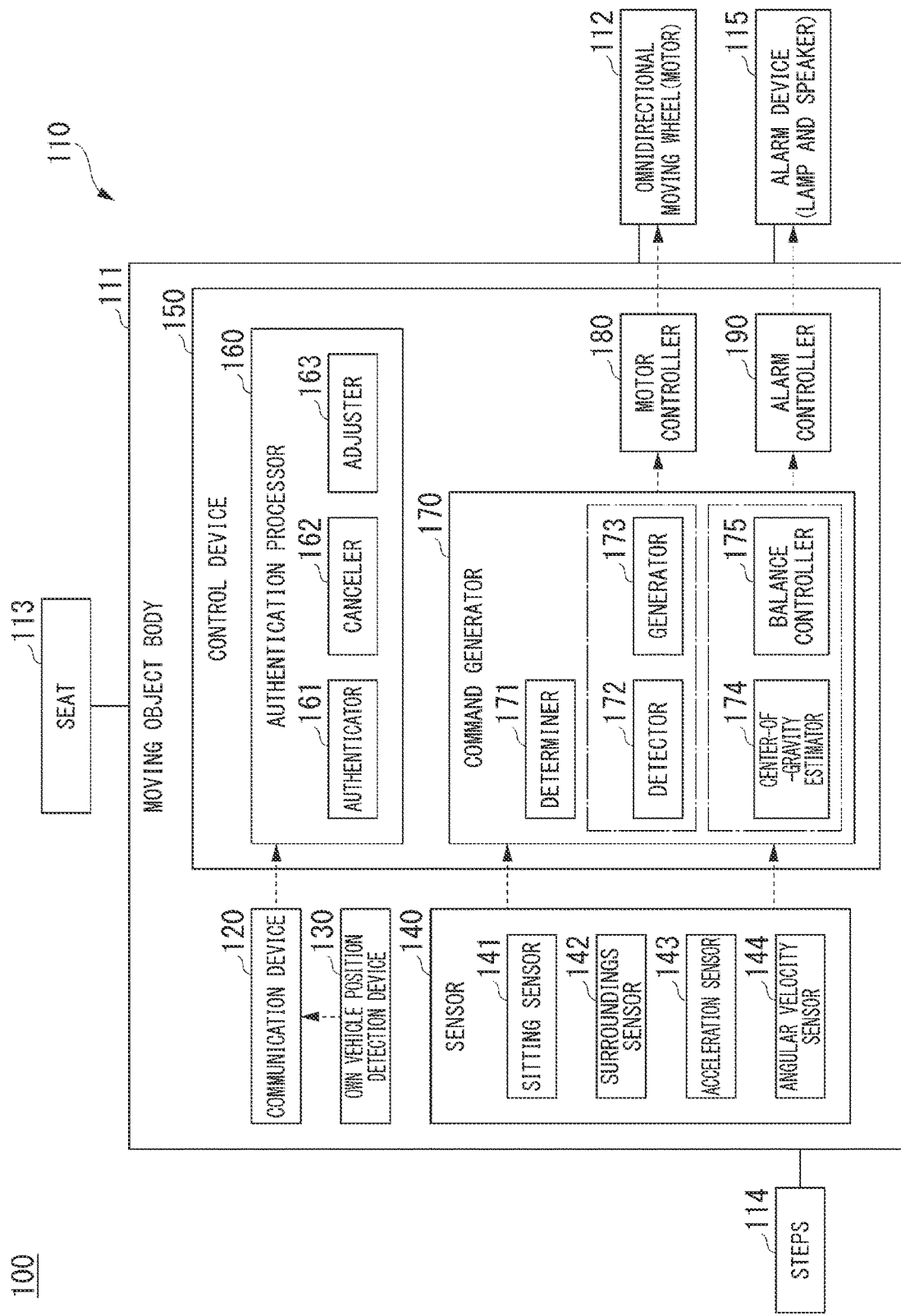
FIG. 2 is a configuration diagram showing an example of a ridable moving object 100.

FIG. 2 is a configuration diagram showing an example of the ridable moving object 100. The ridable moving object 100 includes, for example, a moving object body 110, a communication device 120, an own vehicle position detection device 130, a sensor 140, and a control device 150. The moving object body 110 includes, for example, a cover panel 111, an omnidirectional moving wheel 112, a seat 113, steps 114, and an alarm device 115.

Figure 3:
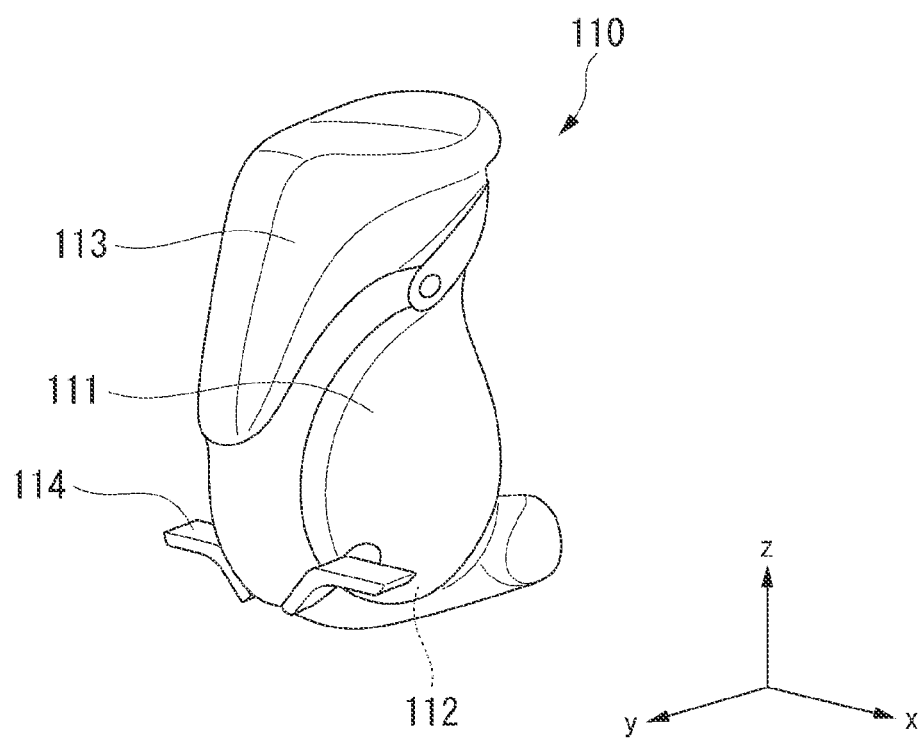
FIG. 3 is a perspective view showing an internal structure of the ridable moving object 100.

FIG. 3 is a perspective view showing an internal structure of the ridable moving object 100. In FIG. 3, a width direction of the ridable moving object 100 is referred to as an x-direction, a forward-rearward direction thereof is referred to as a y-direction, and an upward-rearward direction thereof is referred to as a z-direction. The forward direction of the ridable moving object 100 is a positive direction of a y-axis (a direction from the back side of the paper surface to the front side of the paper surface, hereinafter referred to as a +y-axis direction) and the rearward direction thereof is a negative direction of the y-axis (a direction from the front side of the paper surface to the back side of the paper surface, hereinafter referred to as a −y-axis direction).

Figure 4:
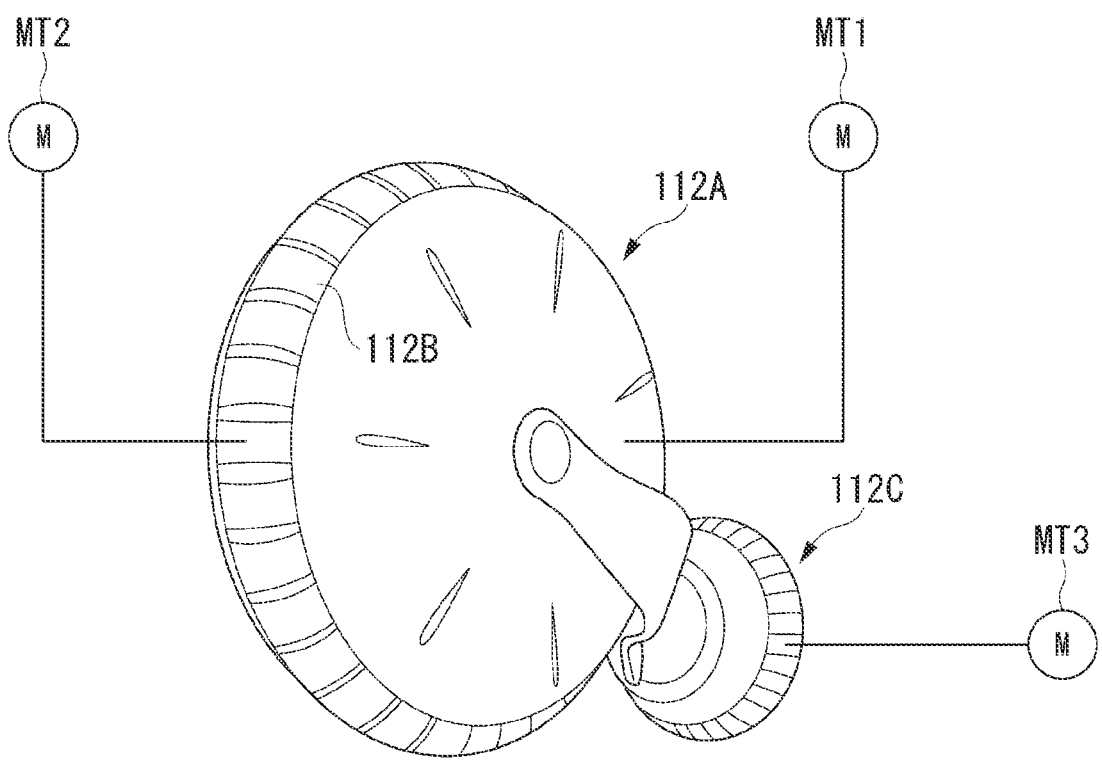
FIG. 4 is a perspective view of an omnidirectional moving wheel 112.

The cover panel 111 is made of, for example, resin. The omnidirectional moving wheel 112 is provided on a lower portion inside of the cover panel 111. FIG. 4 is a perspective view of the omnidirectional moving wheel 112. The omnidirectional moving wheel 112 includes a large-diameter wheel 112A, a small-diameter wheel 112B, a turning wheel 112C, a first motor MT1, a second motor MT2, and a third motor MT3. The large-diameter wheel 112A is a wheel that can rotate around the x-axis. The large-diameter wheel 112A is rotated by the first motor MT1.

The small-diameter wheel 112B is a wheel that can rotate around an axis orthogonal to a straight line in a radial direction in the central cross-section in the width direction of the large-diameter wheel 112A. The omnidirectional moving wheel 112 includes a plurality of small-diameter wheels 112B. The plurality of small-diameter wheels 112B are disposed at substantially equal intervals along a circumferential direction of the large-diameter wheel 112A. The plurality of small-diameter wheels 112B are simultaneously rotated by the second motor MT2.

The turning wheel 112C is a wheel that can rotate around the y-axis. The turning wheel 112C has a smaller diameter than the large-diameter wheel 112A. The turning wheel 112C is rotated by the third motor MT3. The omnidirectional moving wheel 112 moves the ridable moving object 100 by rotating at least one of the large-diameter wheel 112A, the small-diameter wheels 112B, and the turning wheel 112C. An operation of the omnidirectional moving wheel 112 will be described below.

The seat 113 is attached above the cover panel 111. The seat 113 is a member on which the user U getting on the ridable moving object 100 sits. The steps 114 are attached to a lower front portion of the cover panel 111. The steps 114 are members on which the user U places his or her legs. The step 114 is a variable step whose width and height can be adjusted.

The alarm device 115 includes, for example, a lamp and a speaker. The alarm device 115 is operated under the control of the control device 150. The lamp is attached to the periphery of the moving object body 110 and outputs a light alarm around the moving object body 110 by performing light emission such as lighting or blinking. The speaker is provided on the outside of the moving object body 110 and outputs an alarm sound around the moving object body 110.

Figure 5:
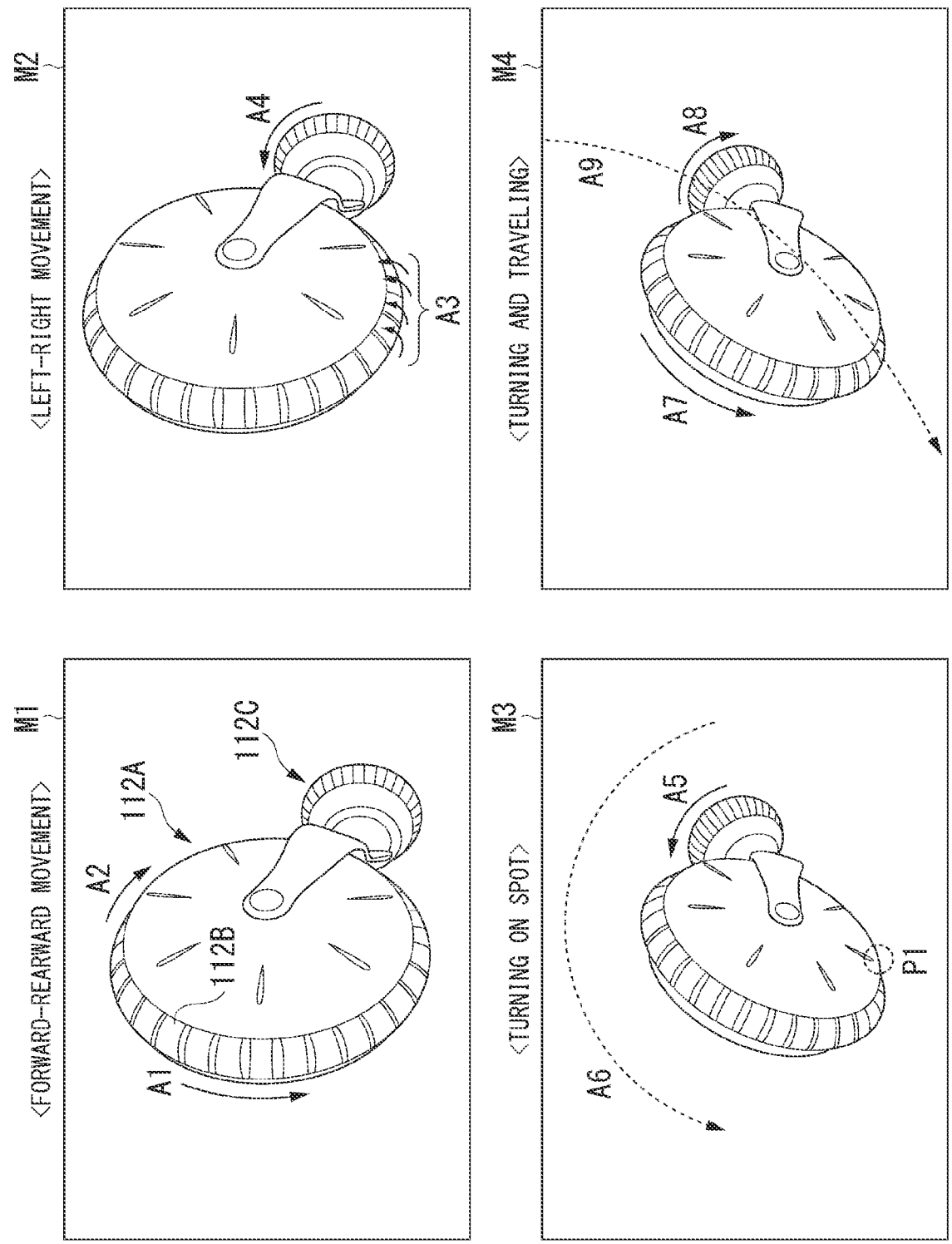
FIG. 5 is a diagram for describing a configuration and an operation of the omnidirectional moving wheel 112 of the ridable moving object 100.

Next, a configuration and an operation of the omnidirectional moving wheel 112 of the ridable moving object 100 will be described. FIG. 5 is a diagram for describing the configuration and the operation of the omnidirectional moving wheel 112 of the ridable moving object 100. The omnidirectional moving wheel 112 is a wheel that enables the vehicle to immediately advance in any direction (all directions of 360 degrees) from a current position without performing a preliminary operation such as turning. The omnidirectional moving wheel 112 includes, for example, the large-diameter wheel 112A serving as a front wheel and the turning wheel 112C serving as a rear wheel, and the plurality of small-diameter wheels 112B are provided on a ground contact portion (a diametrical edge portion) of the large-diameter wheel 112A that is the front wheel.

The large-diameter wheel 112A is a wheel that mainly implements straight-ahead movement in the forward-rearward direction. The small-diameter wheel 112B is a wheel that mainly implements lateral movement on the spot by rotating around a rotation direction (a circumferential direction) of the large-diameter wheel 112A as an axis. On the other hand, the turning wheel 112C, which is the rear wheel, has a smaller diameter than the large-diameter wheel 112A and is a wheel that mainly implements turning movement by rotating on a rotation axis orthogonal to the rotation axis of the large-diameter wheel 112A.

The omnidirectional moving wheel 112 includes a motor (not shown) that can independently control the rotations of the large-diameter wheel 112A, the small-diameter wheels 112B, and the turning wheel 112C. According to this configuration, the omnidirectional moving wheel 112 can also implement agile movements such as bending and turning on the spot as well as movements in various directions such as a right-lateral direction and a diagonal direction using a lateral movement speed difference of the front and rear wheels in addition to the front-rear movement.

Here, the forward direction of the ridable moving object 100 is a positive direction of the y-axis in FIG. 3 (a direction from the back side of the paper surface to the front side of the paper surface, hereinafter referred to as a +y-axis direction) and the rearward direction thereof is a negative direction of the y-axis (a direction from the front side of the paper surface to the back side of the paper surface, hereinafter referred to as a −y-axis direction). For example, as shown in an operation example M1 (forward movement/rearward movement) of FIG. 5, the omnidirectional moving wheel 112 moves forward by rotating the large-diameter wheel 112A in a direction of an arrow A1 and moves rearward by rotating the large-diameter wheel 112A in a direction of an arrow A2.

Also, as shown in an operation example M2 (left-right movement) of FIG. 5, the omnidirectional moving wheel 112 can move in the left direction on the spot without changing the direction by rotating the small-diameter wheels 112B in a direction of an arrow A3. In this case, the turning wheel 112C may be configured to rotate naturally in a direction of an arrow A4 according to the movement in the left-right direction or may be controlled to rotate in the direction of the arrow A4 in accordance with an amount of rotation of the small-diameter wheels 112B. Also, the omnidirectional moving wheel 112 can move in the right direction on the spot without changing the direction by rotating the small-diameter wheels 112B in a direction opposite to the arrow A3. Also, the left direction mentioned here is the left direction in FIG. 3 and corresponds to a negative direction of the x-axis (a −x-axis direction) and the right direction is the right direction in FIG. 3 and corresponds to a positive direction of the x-axis (a +x-axis direction). Also, the plurality of small-diameter wheels 112B may be configured such that all the wheels rotate simultaneously or may be configured such that only the wheels of the ground contact portion rotate.

As shown in an operation example M3 (turning on the spot) of FIG. 5, the omnidirectional moving wheel 112 can turn in a direction of an arrow A6 on the spot in a state in which the ground contact point P1 of the large-diameter wheel 112A is designated as the center by rotating the turning wheel 112C in a direction of an arrow A5 and can turn in the direction of the arrow A6 on the spot in a direction opposite to the arrow A6 by rotating the turning wheel 112C in a direction opposite to the arrow A5.

As shown in an operation example M4 (turning and traveling) of FIG. 5, the omnidirectional moving wheel 112 can move forward while turning in a direction of an arrow A9 by rotating the large-diameter wheel 112A in a direction of an arrow A7 and rotating the turning wheel 112C in a direction of an arrow A8 (turning and traveling). Also, the omnidirectional moving wheel 112 can move rearward while turning in a direction opposite to the arrow A9 by rotating the large-diameter wheel 112A in a direction opposite to the arrow A7 and rotating the turning wheel 112C in the direction of the arrow A8. Also, in this example, the omnidirectional moving wheel 112 can move forward or rearward while keeping the turning center on the right side by rotating the turning wheel 112C in a direction opposite to the arrow A8.

A method of implementing the omnidirectional moving wheel 112 is not limited to the method of FIG. 5. The omnidirectional moving wheel 112 may be implemented with any existing technology. Also, the ridable moving object 100 may include one omnidirectional moving wheel 112 or may include a plurality of omnidirectional moving wheels 112. Further, the ridable moving object 100 may include ordinary wheels as auxiliary wheels in addition to the omnidirectional moving wheel 112.

The communication device 120 performs wireless communication on the basis of, for example, Wi-Fi, DSRC, Bluetooth (registered trademark), and other communication standards. The communication device 120 receives an electrical signal transmitted by the terminal device 200 and outputs the electrical signal to the control device 150. The communication device 120 transmits an electrical signal output by the control device 150 to the terminal device 200. In place of or in addition to the communication device 120, a near-field communication function of performing near-field communication (NFC) with the terminal device 200 may be provided.

The own vehicle position detection device 130 detects a position of the ridable moving object 100 which is an own vehicle. The own vehicle position detection device 130 is, for example, a global navigation satellite system (GNSS) device. The own vehicle position detection device 130 outputs an own vehicle position signal indicating the detected position of the own vehicle (the ridable moving object 100) to the communication device 120. The communication device 120 transmits the output own vehicle position signal to the terminal device 200 owned by the user U for whom usage authority is set.

The sensor 140 includes, for example, a sitting sensor 141, a surroundings sensor 142, an acceleration sensor 143, and an angular velocity sensor 144. The sitting sensor 141 detects a sitting state of whether or not a rider is sitting on the seat 113. The sitting sensor 141 outputs a sitting signal indicating the sitting state of the rider to the control device 150.

The surroundings sensor 142 is a sensor that detects a physical object in the vicinity of the ridable moving object 100. The surroundings sensor 142 detects, for example, a distance between the detected physical object and the ridable moving object 100. The surroundings sensor 142 outputs a nearby physical object signal related to the detected physical object and the distance between the detected physical object and the ridable moving object 100 to the control device 150. The surroundings sensor 142 may be, for example, an ultrasonic sensor using ultrasonic waves as a medium, an optical sensor using light as a medium, or an image sensor that captures an image of the surroundings of the ridable moving object 100.

The acceleration sensor 143 is attached to any location on one or both of the moving object body 110 and the seat 113. The acceleration sensor 143 detects the acceleration acting on the attachment location and outputs the acceleration to the control device 150. Likewise, the angular velocity sensor 144 is also attached to any location on one or both of the moving object body 110 and the seat 113. The angular velocity sensor 144 detects an angular velocity acting on the attachment location and outputs the angular velocity to the control device 150.

The control device 150 includes, for example, an authentication processor 160, a command generator 170, a motor controller 180, and an alarm controller 190. The authentication processor 160 includes, for example, an authenticator 161, a canceler 162, and an adjuster 163. The command generator 170 includes, for example, a determiner 171, a detector 172, a generator 173, a center-of-gravity estimator 174, and a balance controller 175.

These components are implemented, for example, by a hardware processor such as a central processing unit (CPU) executing a program (software). Some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be prestored in a storage device (a storage device including a non-transitory storage medium) such as a hard disk drive (HDD) or a flash memory or may be stored in a removable storage medium (a non-transitory storage medium) such as a DVD or a CD-ROM and installed in the storage device when the storage medium is mounted in a drive device. The storage device stores a moving object ID assigned to its own vehicle.

The functions of parts of the control device 150 will be described after description of the functions of the terminal device 200.

Figure 6:
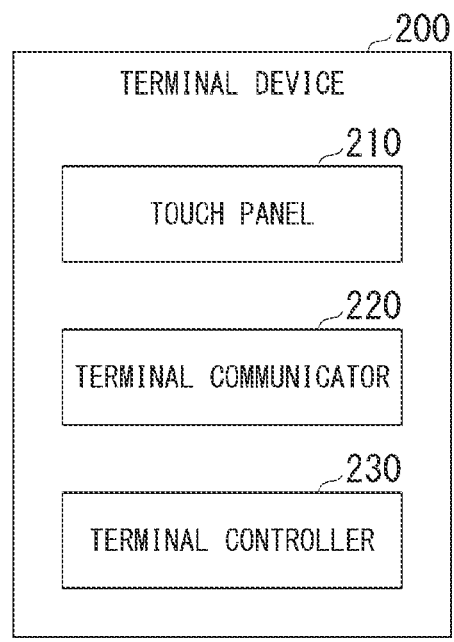
FIG. 6 is a configuration diagram showing an example of a terminal device 200.

FIG. 6 is a configuration diagram showing an example of the terminal device 200. The terminal device 200 is, for example, a portable terminal such as a smartphone or a tablet owned by the user U. In the terminal device 200, an application program for employing a service using the ridable moving object 100, a browser, or the like is activated to support the service to be described below. In the following description, it is assumed that the terminal device 200 is a smartphone and an application program (a moving object rental application) is being activated. The terminal device 200 includes a storage unit and stores a user ID corresponding to the application program.

The terminal device 200 includes, for example, a touch panel 210, a terminal communicator 220, and a terminal controller 230. The touch panel 210 displays, for example, a graphical user interface (GUI) image and receives an input operation such as an operation in which the user U touches the GUI image by hand. The touch panel 210 outputs an electrical signal corresponding to the received input operation to the terminal controller 230.

For example, when the user U has executed an operation of requesting the setting of usage authority to use the ridable moving object 100, the touch panel 210 outputs a usage authority setting request signal for requesting the setting of the usage authority to the terminal controller 230. For example, when the user U whose usage authority is set is temporarily away from the ridable moving object 100 and approaches the ridable moving object 100 again, the touch panel 210 outputs a person verification request signal for requesting person verification to the terminal controller 230 when a person verification request operation has been executed.

The terminal controller 230 adds the user ID stored in the storage unit to the usage authority setting request signal and the person verification request signal output by the touch panel 210 and outputs the signals to which the user ID is added to the terminal communicator 220.

The terminal communicator 220 performs wireless communication on the basis of, for example, Wi-Fi, DSRC, Bluetooth (registered trademark), and other communication standards. The terminal communicator 220 transmits the usage authority setting request signal and the person verification request signal output by the terminal controller 230 to the communication device 120 of the ridable moving object 100. The terminal communicator 220 receives an electrical signal transmitted by the communication device 120 of the ridable moving object 100, for example, an own vehicle position signal, and outputs the electrical signal to the terminal controller 230 designated by the authenticator 161.

The terminal controller 230 controls a display process of the touch panel 210 in accordance with the electrical signal output by the terminal communicator 220. For example, the terminal controller 230 identifies the position of the ridable moving object 100 matched with the user U on the basis of the own vehicle position signal transmitted by the ridable moving object 100 and causes the touch panel 210 to display an image of the ridable moving object 100 matched with the user U together with an augmented reality (AR) image.

The AR image is, for example, a decoration display image for the ridable moving object 100. The storage unit of the terminal device 200 may store a shape (appearance) of the ridable moving object 100 and the terminal controller 230 may adjust the position of the ridable moving object on the basis of the own vehicle position signal transmitted by the ridable moving object 100 and the shape of the ridable moving object 100 stored in the storage unit.

Hereinafter, the functions of the parts of the control device 150 of the ridable moving object 100 will be described again. The command generator 170 of the control device 150 mainly generates a movement command when the user U does not get on (or gets off) the ridable moving object 100. The authenticator 161 acquires a usage authority setting request signal transmitted by the terminal device 200 and output by the communication device 120 and matches a user ID added to the usage authority setting request signal with a moving object ID.

The authenticator 161 matches the user U with the ridable moving object 100 by matching the user ID with the moving object ID. The authenticator 161 sets the usage authority for the user U who has the user ID matched with the moving object ID. The authenticator 161 designates the terminal device 200 possessed by the user who has set the usage authority as the terminal device 200 to which the communication device 120 will transmit a GNSS signal.

The canceler 162 measures an elapsed period of time after the user U is away from the ridable moving object 100. When a prescribed period of time has elapsed after the user U was away from the ridable moving object 100, the canceler 162 cancels the usage authority for the user U to use the ridable moving object 100 on the assumption that the cancelation condition is satisfied. The prescribed period of time may be fixed or may be a period of time that varies with specific conditions. The specific conditions may be, for example, a stop position of the ridable moving object 100, a time period, the number of people who have visited the amusement facility P together with the user U, human relations such as family and friends, and the like. The cancellation condition may be another condition. For example, the cancelation condition may be that the user U has performed an operation indicating a usage intention to cancel the usage authority and the canceler 162 has acquired a signal corresponding to the operation.

The adjuster 163 receives a usage authority setting request signal (hereinafter, another person's request signal) transmitted by the terminal device 200 of a user (hereinafter, the other person) other than the user for whom the usage authority has been set and determines whether or not the usage authority has been set for the user U when the other person requests the usage authority to use the ridable moving object 100. The adjuster 163 sets the usage authority to use the ridable moving object 100 for the other person when the usage authority has not been set for the user U.

The determiner 171 in the command generator 170 determines whether or not the user U is sitting on the basis of the sitting signal output by the sitting sensor 141. After the user U sits on the seat 113 temporarily, the determiner 171 determines whether or not the user U has been away from the ridable moving object 100. The determiner 171 determines that the user U has been away from the ridable moving object 100, for example, when the user U has temporarily sat on the seat 113 and then has been separated from the seat 113.

The detector 172 and the generator 173 in the command generator 170 function when the user U does not get on the ridable moving object 100. The detector 172 detects a usage intention of another person different from the user U for the ridable moving object 100. The detector 172 detects the presence or absence of a physical object approaching the ridable moving object 100 in the vicinity of the ridable moving object 100, for example, on the basis of a nearby physical object signal output by the surroundings sensor 142. The detector 172 determines whether or not the communication device 120 has received the other person's request signal to which the other person's user ID is added.

For example, when there is a physical object approaching the ridable moving object 100 and the physical object is another person different from the user U, the detector 172 detects a usage intention of the other person for the ridable moving object 100. The detector 172 may detect the usage intention of the other person different from the user U for the ridable moving object 100 under another condition. For example, the usage intention of the other person may be detected when the other person's request signal has been received or the usage intention of the other person may be detected by adding another condition.

When the determiner 171 determines that the user U has been away from the ridable moving object 100 and the detector 172 has detected the usage intention of the other person for the ridable moving object 100, the generator 173 generates an action command for the ridable moving object 100 on the basis of the usage authority set for the user U. The generator 173 generates, for example, an action command for causing the ridable moving object 100 to execute a separation operation in which the ridable moving object 100 is away from the other person.

Further, the generator 173 generates an action command for causing the alarm device 115 to execute an alarm operation such as light emission or voice output. The generator 173 generates a control command based on the generated action command. The command generator 170 outputs the control command generated by the generator 173 to the motor controller 180 and the alarm controller 190. The separation operation and the alarm operation are examples of the prescribed operation.

The center-of-gravity estimator 174 and the balance controller 175 in the command generator 170 function when the user U gets on the ridable moving object 100. The center-of-gravity estimator 174 estimates centers of gravity of physical objects including the user U having gotten on the ridable moving object 100, the moving object body 110, and the seat 113 on the basis of outputs of the acceleration sensor 143 and the angular velocity sensor 144.

The balance controller 175 generates a control command in a direction in which the position of the center of gravity estimated by the center-of-gravity estimator 174 returns to a reference position (a position of a center of gravity in a stationary state). For example, when the position of the center of gravity is biased to the right rear of the reference position, the balance controller 175 generates information indicating the acceleration toward the right rear as the control command.

For example, when the action command is accelerated forward movement and the position of the center of gravity is behind the reference position, the balance controller 175 may limit the acceleration such that the position of the center of gravity is not further biased to a rearward position according to the accelerated forward movement or may start accelerated forward movement after a temporary retreat operation and the guidance of the position of the center of gravity to a forward position are performed. The command generator 170 outputs the control command generated by the balance controller 175 to the motor controller 180.

The motor controller 180 individually controls each motor attached to the omnidirectional moving wheel 112 on the basis of the control command output by the command generator 170. The motor controller 180 executes different control processes when the user U gets on (or sits in) the ridable moving object 100 and when the user U does not get on the ridable moving object 100.

When the user U is getting on the ridable moving object 100, the user U getting on the ridable moving object 100 can cause the ridable moving object 100 to move in a desired direction by changing his/her own posture and moving the center of gravity in the desired direction according to such control processes. That is, the ridable moving object 100 recognizes the movement of the center of gravity of the user U as a maneuvering operation on the ridable moving object 100 and performs a moving operation corresponding to the maneuvering operation.

The alarm controller 190 outputs an optical alarm by a lamp, and outputs an alarm sound by a speaker, on the basis of a control command output by the command generator 170. A notification indicating that the usage authority has already been set in the ridable moving object 100 and the ridable moving object 100 cannot be used by others is provided by the light alarm and the alarm sound.

Figure 7:
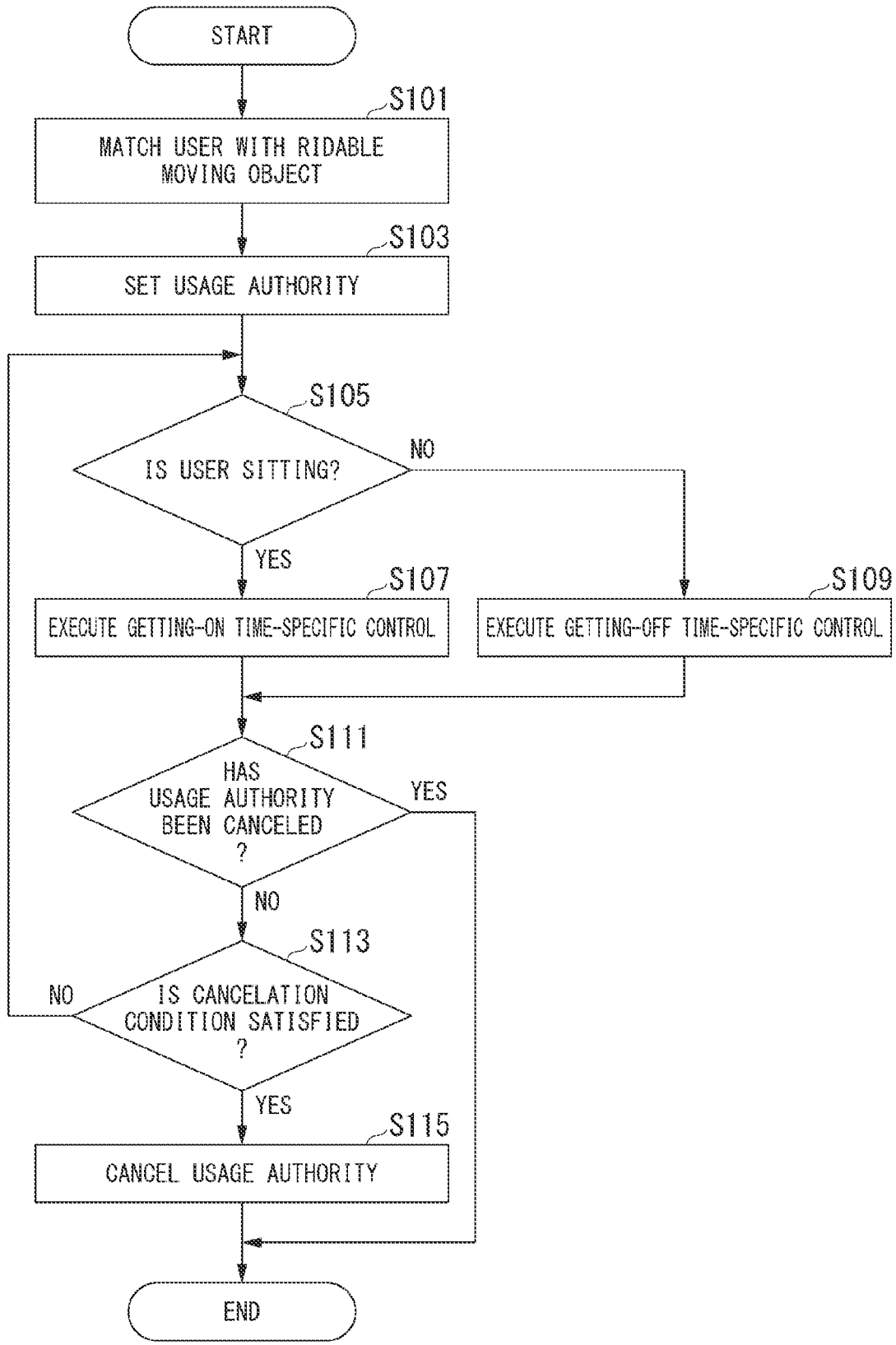
FIG. 7 is a flowchart showing an example of a process of a control device 150.

Subsequently, a control procedure for the ridable moving object 100 in the control device 150 will be described. FIG. 7 is a flowchart showing an example of a process of the control device 150. The control device 150 starts the process shown in FIG. 7 when a usage authority setting request signal transmitted to the communication device 120 by the terminal device 200 has been received. Before the control device 150 receives the usage authority setting request signal in a state in which the usage authority is not set for the user U, the ridable moving object 100 is stored in the parking pool PP or travels (autonomously travels) in the amusement facility P. When the control device 150 receives the usage authority setting request signal, the ridable moving object 100 stops even in the traveling state.

When the communication device 120 receives the usage authority setting request signal, the authenticator 161 matches the user U with the ridable moving object 100 by matching the user ID added to the usage authority setting request signal with the moving object ID stored in the storage unit (S101). The authenticator 161 sets the usage authority to use the ridable moving object 100 for the user U by matching the user U with the ridable moving object 100 (S103). After the usage authority is set, the user U gets on the ridable moving object 100 and therefore the user U can operate (drive) the ridable moving object 100.

Subsequently, the determiner 171 determines whether or not the user U is sitting on the seat 113 (S105). When it is determined that the user U is sitting on the seat 113, the command generator 170 executes a getting-on time-specific control process using the center-of-gravity estimator 174 and the balance controller 175 (S107). When a driving control process is executed, the user U getting on the ridable moving object 100 can cause the ridable moving object 100 to travel in accordance with his/her own will.

When it is determined that the user U is not sitting on the seat 113, the canceler 162 starts the measurement of time after the user U is away from the ridable moving object 100 and the command generator 170 executes a getting-off time-specific control process using the detector 172 and the generator 173 (S109). The getting-off time-specific control process will be further described below.

Subsequently, the canceler 162 determines whether or not the usage authority has been canceled (S111). When it is determined that the usage authority has not been canceled, the canceler 162 determines whether or not a cancelation condition is satisfied (S113). When the canceler 162 determines that the cancelation condition is not satisfied, the process returns to step S105. When it is determined that the cancelation condition is satisfied, the canceler 162 cancels the usage authority set for the user U (S115). In this way, the control device 150 ends the process shown in FIG. 7. Even if the canceler 162 determines that the usage authority has been canceled in step S111, the control device 150 ends the process shown in FIG. 7.

Figure 8:
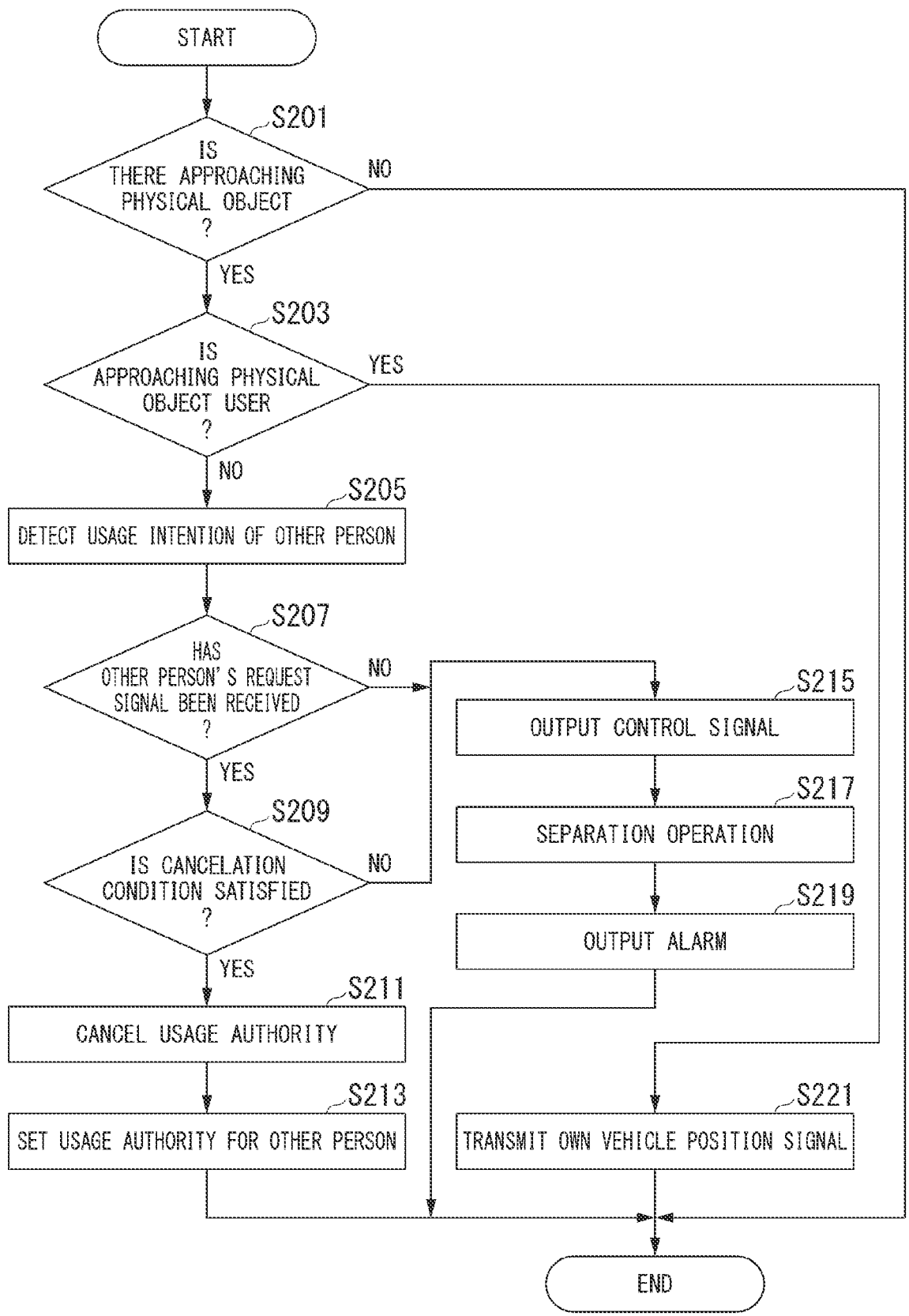
FIG. 8 is a flowchart showing an example of a getting-off time-specific control process.

Subsequently, the getting-off time-specific control process in step S109 will be described. FIG. 8 is a flowchart showing an example of the getting-off time-specific control process.

When the determiner 171 determines that the user is not sitting in step S105, the detector 172 determines whether there is a physical object that approaches the ridable moving object 100 on the basis of a nearby physical object signal transmitted by the surroundings sensor 142 (S201). When it is determined that there is no physical object approaching the ridable moving object 100, the control device 150 ends the process shown in FIG. 8.

When it is determined that there is a physical object approaching the ridable moving object 100, the detector 172 determines whether or not the approaching physical object is the user U (S203). Any method may be executed to determine whether or not the approaching physical object is the user U. For example, the detector 172 may determine whether or not the approaching physical object is the user U on the basis of a person verification request signal including a user ID transmitted by the terminal device 200 of the user U and received by the communication device 120. The detector 172 determines whether or not the approaching physical object is the user U on the basis of an image obtained by imaging the user U and a physical body feature such as a fingerprint of the user U or when the user touches the moving object body 110. When it is determined that the approaching physical object is not the user, the detector 172 detects a usage intention of another person for the ridable moving object 100 when it is determined that the communication device 120 has received the other person's request signal (S205).

Subsequently, the detector 172 determines whether or not the communication device 120 has received the other person's request signal transmitted by the terminal device 200 possessed by the other person (S207). When the communication device 120 determines that the other person's request signal has not been received, the detector 172 moves the process to step S15. When it is determined that the communication device 120 has received the other person's request signal, the canceler 162 determines whether or not the cancelation condition is satisfied (S209). When the canceler 162 determines that the cancelation condition is satisfied, the adjuster 163 cancels the usage authority of the user U (S211). Subsequently, the adjuster 163 sets the usage authority for the other person (S213) and the control device 150 ends the process shown in FIG. 8.

When the canceler 162 determines that the cancelation condition is not satisfied, the generator 173 generates a control signal and outputs the control signal to the motor controller 180 and the alarm controller 190 (S215). The motor controller 180 to which the control signal is output by the generator 173 outputs a control command for causing the ridable moving object 100 to perform a separation operation to the motor of the omnidirectional moving wheel 112. The motor of the omnidirectional moving wheel 112 to which the control command is output by the motor controller 180 causes the ridable moving object 100 to perform the separation operation (S217).

The alarm controller 190 to which the generator 173 has output the control signal outputs a control command for causing the lamp of the alarm device 115 to be turned on and blinked and causing the speaker to output an alarm sound to the alarm device 115. The alarm device 115 to which the control command is output by the alarm controller 190 outputs an alarm in which the lamp is turned on and blinked and the alarm sound is output by the speaker (S219).

For example, a situation in which, when a plurality of ridable moving objects 100 are stopped in the same area, the user U or another person approaches another ridable moving object 100 different from the ridable moving object 100 used by him or her is assumed. Under this situation, for example, the other person may approach the ridable moving object 100 used by the user U by mistaking the ridable moving object 100 used by the user U for the ridable moving object 100 used by him or her. In this case, the control device 150 detects the usage intention of the other person to use the ridable moving object 100 used by the user U. Here, when the other person's request signal has not been received or when the cancellation condition is not satisfied even if the other person's request signal is received, the usage authority is not set for the other person and there is no need for the other person to approach the ridable moving object 100. Thus, the control device 150 causes the ridable moving object 100 to be separated from the other person and causes the alarm device 115 to perform an alarm operation. Subsequently, the control device 150 ends the process shown in FIG. 8.

When it is determined that the physical object approaching the ridable moving object 100 is the user U in step S203, the communication device 120 transmits an own vehicle position signal indicating a position of the ridable moving object 100 detected by the own vehicle position detection device 130 to the terminal device 200 (S221). The terminal device 200, which has received the own vehicle position signal, causes, for example, a decoration display process using AR display, to be performed in accordance with the ridable moving object 100 that stops at a position corresponding to the own vehicle position signal on the touch panel 210 of the terminal device 200, for example, on the assumption that the ridable moving object 100, which stops at a position based on the own vehicle position signal, is a ridable moving object whose usage authority is given to the user U. By performing a decoration display process for the ridable moving object 100 that stops at the position indicated in the own vehicle position signal, the user U can be allowed to easily know the position of his or her own vehicle. In this way, the control device 150 ends the process shown in FIG. 8.

When the ridable moving object 100 of the first embodiment determines that the user U has been away from the ridable moving object 100 and the usage intention of another person for the ridable moving object 100 has been detected, the ridable moving object 100 is allowed to perform a prescribed operation on the basis of setting information set with respect to the user U and the ridable moving object 100. Specifically, when the information for which the usage authority is set is the setting information, the ridable moving object 100 is allowed to execute the prescribed operation.

For example, when the user U approaches the ridable moving object 100 for which the usage authority is set, the own vehicle position signal is transmitted to the terminal device 200 of the user U and the touch panel 210 of the terminal device 200 is allowed to perform a decoration display process for the own vehicle position. Alternatively, when another person approaches the ridable moving object 100 for which the usage authority is set, the ridable moving object 100 moves in a direction away from the other person and the other person is allowed to recognize that a person (the user U) other than the other person to which an alarm has been output by the alarm device 115 has the usage authority to use the ridable moving object 100. Therefore, it is possible to limit the misuse of the moving object by another person.

Second Embodiment

Figure 9:
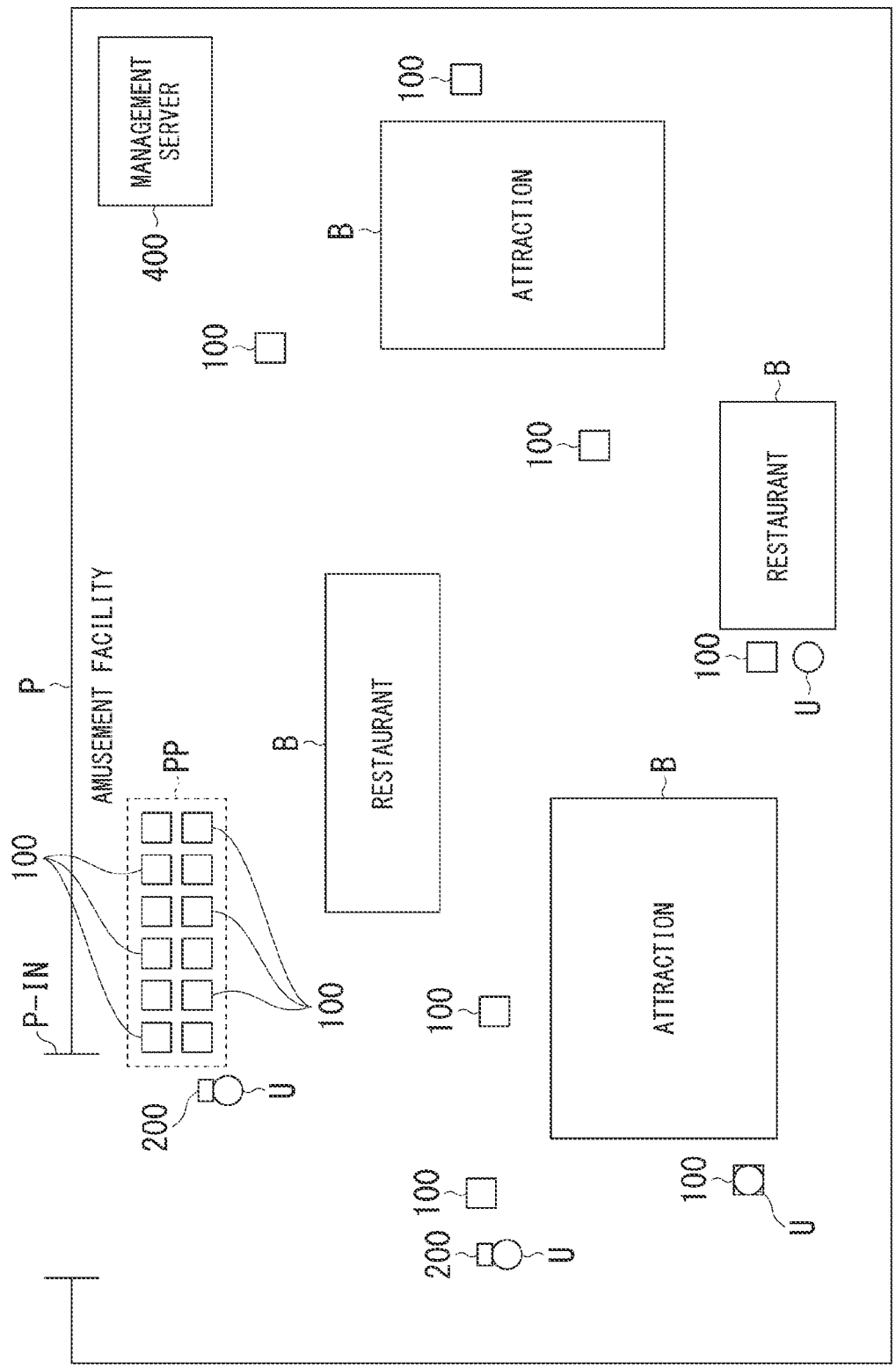
FIG. 9 is an explanatory diagram for describing an outline of a moving object management system 2 of a second embodiment.

Next, a second embodiment will be described. FIG. 9 is an explanatory diagram for describing an outline of a moving object management system 2 of the second embodiment. The moving object management system 2 of the second embodiment is mainly different from the moving object management system 1 of the first embodiment in that a management server 400 is provided. The management server 400 is installed in, for example, an amusement facility P. In the description of the second embodiment, the members, the functions, and the like that are the same as those of the first embodiment may be denoted by the same reference signs and description thereof may be omitted.

The management server 400 in the moving object management system 2 of the second embodiment is installed within the amusement facility P. The management server 400 manages a plurality of ridable moving objects 100 within the amusement facility P. The management server 400 recognizes a position of the ridable moving object 100 within the amusement facility P. The management server 400 manages the movement of the ridable moving object 100 for which the usage authority is not set for the user U.

The ridable moving object 100 transmits an own vehicle position signal to the management server 400 as well as a terminal device 200. A touch panel 210 of the terminal device 200 outputs a vehicle allocation request signal for requesting the vehicle allocation of the ridable moving object 100 to a terminal communicator 220, for example, when the user U has executed an operation for requesting the vehicle allocation of the ridable moving object 100. The terminal communicator 220 transmits the vehicle allocation request signal output by the touch panel 210 to the management server 400.

Figure 10:
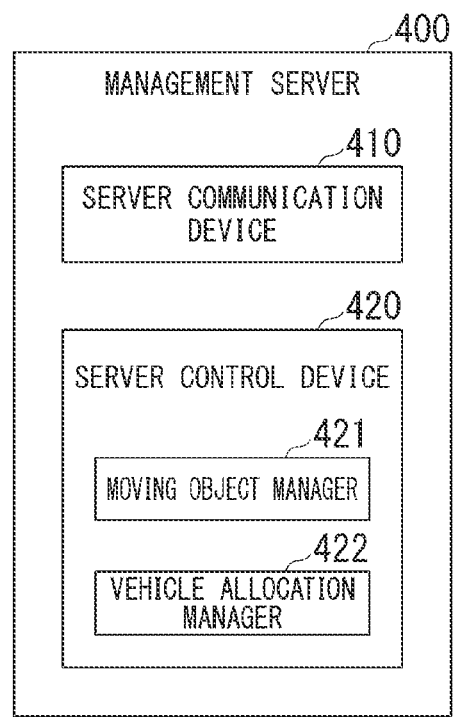
FIG. 10 is a configuration diagram showing an example of a management server 400.

FIG. 10 is a configuration diagram showing an example of the management server 400. The management server 400 includes, for example, a server communication device 410 and a server control device 420. The server communication device 410 performs wireless communication on the basis of, for example, Wi-Fi, DSRC, Bluetooth (registered trademark), and other communication standards.

The server communication device 410 receives electrical signals transmitted by the ridable moving object 100 and the terminal device 200 and outputs the electrical signals to the server control device 420. For example, the server communication device 410 outputs an own vehicle position signal transmitted by the ridable moving object 100 and a vehicle allocation request signal transmitted by the terminal device 200 to the server control device 420.

The server control device 420 includes, for example, a moving object manager 421 and a vehicle allocation manager 422. The server control device 420 is implemented, for example, by a hardware processor such as a CPU executing a program (software). Some or all of the above components may be implemented by hardware (including a circuit; circuitry) such as an LSI circuit, an ASIC, an FPGA, or a GPU or may be implemented by software and hardware in cooperation. The program may be prestored in a storage device (a storage device including a non-transitory storage medium) such as an HDD or a flash memory or may be stored in a removable storage medium (a non-transitory storage medium) such as a DVD or a CD-ROM and installed in the storage device when the storage medium is mounted in a drive device.

The moving object manager 421 recognizes positions of the plurality of ridable moving bodies 100 within the amusement facility P on the basis of own vehicle position signals transmitted by the plurality of ridable moving objects 100. The moving object manager 421 generates a movement plan for moving the ridable moving object 100 to a region where the number of ridable moving objects 100 is small with reference to the recognized positions of the plurality of ridable moving objects 100 and a map of the amusement facility P. The moving object manager 421 generates a movement signal for achieving the movement plan and outputs the movement signal to the server communication device 410.

When the server communication device 410 has received the vehicle allocation request signal transmitted by the terminal device 200, the vehicle allocation manager 422 generates a vehicle allocation signal for moving the ridable moving object 100 for which no usage authority is set to a position of the terminal device 200 that has transmitted the vehicle allocation request signal. The vehicle allocation manager 422 designates the ridable moving object 100 in the vicinity of the terminal device 200 that has transmitted the vehicle allocation request signal as a vehicle allocation target. The vehicle allocation manager 422 outputs the generated vehicle allocation signal to the server communication device 410.

The server communication device 410 transmits the movement signal output by the moving object manager 421 to the ridable moving object 100. The server communication device 410 transmits the vehicle allocation signal generated by the vehicle allocation manager 422 to the ridable moving object 100 designated by the vehicle allocation manager 422 as the vehicle allocation target.

The ridable moving object 100 in the moving object management system 2 of the second embodiment can limit the misuse of the moving object by another person as in the first embodiment. The moving object management system 2 of the second embodiment manages a plurality of ridable moving objects 100. Thus, the amusement facility P can be efficiently managed. In the moving object management system 2 of the second embodiment, the ridable moving object 100 can be allocated in response to the vehicle allocation request requested by the terminal device 200. Thus, the user U can be allowed to use the ridable moving object 100 easily.

Although a control device 150 of the ridable moving object 100 includes an authentication processor 160 and a command generator 170 in the moving object management system 2 of the second embodiment, one or both of them may be provided in the management server 400. For example, functions corresponding to a determiner 171, a detector 172, and a generator 173 may be provided in the server control device 420 of the management server 400. In this case, the ridable moving object 100 or the terminal device 200 may transmit necessary electrical signals, for example, a sitting signal, a nearby physical object signal, a request signal, and the like, to the server communication device 410 of the management server 400.

Although the terminal device 200 is premised on the fact that an application program (a moving object rental application) is activated in each of the above-described embodiments, it is only necessary for the application program to be activated at least when the ridable moving object 100 is rented to the user U. Preferably, the application program is also activated when the image of the ridable moving object 100 is displayed together with the AR image.

Although the user U can get on and use the ridable moving object 100 by setting the usage authority of the user U in the ridable moving object 100 in each of the above-described embodiments, a user who has sat on the seat 113 may be able to use the ridable moving object 100 without setting the usage authority. In particular, the ridable moving object 100 that goes around the premises of the amusement facility P may be configured to be usable without setting usage authority.

Although prescribed information is information of the usage authority set for the user U and the ridable moving object 100 in each of the above-described embodiments, the prescribed information may be other information, for example, a stop position where the ridable moving object 100 has stopped when the user U has gotten off the ridable moving object 100. In this case, for example, when the stop position is a prescribed place, for example, in the vicinity of the internal facility B, it is assumed that the user U who has finished the use of the internal facility B will get on the ridable moving object 100 again. Thus, for example, when the generator 173 has detected a position of use by another person, the generator 173 may generate an action command for executing an action such as notifying that there is a user for whom the usage authority has already been set and the use by the other person is impossible.

Also, a prescribed period of time for determining the cancellation condition may be changed with a stop position where the ridable moving object 100 has stopped when the user U has gotten off the ridable moving object 100. For example, the prescribed period of time may be lengthened when it is assumed that the internal facility B is a popular attraction and the use thereof is time-consuming and the prescribed period of time may be shortened when the internal facility B is a facility that can be used in a short time such as a facility for selling popcorn.

Although a time limit or the like is not set for the usage authority set for the user U in each of the above-described embodiments, a time limit may be set. Alternatively, the usage authority to use a specific ridable moving object 100 exclusively may be given to the user U. The exclusive usage authority may be set for one specific ridable moving object 100 or may be set in accordance with a type of ridable moving object 100. For example, when a specific character is drawn only on some ridable moving objects 100 among a plurality of ridable moving objects 100 in the amusement facility P, the usage authority may be set for the ridable moving object 100 on which the specific character is drawn.

In the above-described embodiment, the terminal device 200 displays the ridable moving object 100 and enables the ridable moving object 100 for which the usage authority is set to be found easily by executing an AR display process or the like. Further, the terminal device 200 may be configured to display, for example, an internal map of an amusement facility and a position where a ridable moving object 100 has stopped on the map on the touch panel 210.

The embodiment described above can be represented as follows.

A control device for a ridable moving object including:
a storage device storing a program, and
a hardware processor configured to execute the program to:
  determine that a user has been away from the ridable moving object;
  detect a usage intention of another person different from the user for the ridable moving object; and
  generate an action command for causing the ridable moving object to perform a prescribed operation on the basis of setting information set for at least one of the user and the ridable moving object when it is determined that the user has been away from the ridable moving object and the usage intention of the other person for the ridable moving object has been detected.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A ridable moving object on which a user gets, the ridable moving object comprising a processor configured to execute a program to:
   determine that the user has been away from the ridable moving object;
   detect a usage intention of another person different from the user for the ridable moving object; and
   generate an action command for causing the ridable moving object to perform a prescribed operation on a basis of setting information set for at least one of the user and the ridable moving object when it is determined that the user has been away from the ridable moving object and the usage intention of the another person for the ridable moving object has been detected, wherein
   the processor is further configured to execute the program to cancel usage authority of the user to use the ridable moving object after the user is away from the ridable moving object and a prescribed period of time elapses,
   the setting information comprises information indicating that a stop position of the ridable moving object is included in a prescribed place, and
   the prescribed period of time is set in accordance with the prescribed place.

2. The ridable moving object according to claim 1, wherein the prescribed operation comprises at least one of an alarm including a sound or light emission output and a separation operation for separation from the another person.

3. The ridable moving object according to claim 1, wherein the processor is further configured to execute the program to set usage authority to use the ridable moving object for the another person requesting the usage authority when the user does not have the usage authority to use the ridable moving object on a basis of the setting information.

4. A control device for a ridable moving object comprising a processor configured to execute a program to:
   determine that a user has been away from the ridable moving object;
   detect a usage intention of another person different from the user for the ridable moving object; and
   generate an action command for causing the ridable moving object to perform a prescribed operation on a basis of setting information set for at least one of the user and the ridable moving object when it is determined that the user has been away from the ridable moving object and the usage intention of the another person for the ridable moving object has been detected, wherein
   the processor is further configured to execute the program to cancel usage authority of the user to use the ridable moving object after the user is away from the ridable moving object and a prescribed period of time elapses,
   the setting information comprises information indicating that a stop position of the ridable moving object is included in a prescribed place, and
   the prescribed period of time is set in accordance with the prescribed place.

5. A control method for a ridable moving object, the control method comprising:
   determining, by a computer, that a user has been away from the ridable moving object;
   detecting, by the computer, a usage intention of another person different from the user for the ridable moving object; and
   generating, by the computer, an action command for causing the ridable moving object to perform a prescribed operation on a basis of setting information set for at least one of the user and the ridable moving object when it is determined that the user has been away from the ridable moving object and the usage intention of the another person for the ridable moving object has been detected,
   wherein
   the control method further comprises canceling usage authority of the user to use the ridable moving object after the user is away from the ridable moving object and a prescribed period of time elapses,
   the setting information comprises information indicating that a stop position of the ridable moving object is included in a prescribed place, and
   the prescribed period of time is set in accordance with the prescribed place.

6. A non-transitory computer-readable storage medium storing a program for causing a computer to:
   determine that a user has been away from a ridable moving object;
   detect a usage intention of another person different from the user for the ridable moving object; and
   generate an action command for causing the ridable moving object to perform a prescribed operation on a basis of setting information set for at least one of the user and the ridable moving object when it is determined that the user has been away from the ridable moving object and the usage intention of the another person for the ridable moving object has been detected, wherein
   the program further causes the computer to cancel usage authority of the user to use the ridable moving object after the user is away from the ridable moving object and a prescribed period of time elapses,
   the setting information comprises information indicating that a stop position of the ridable moving object is included in a prescribed place, and
   the prescribed period of time is set in accordance with the prescribed place.

* * * * *